US011453165B2

(12) United States Patent
Payne et al.

(10) Patent No.: US 11,453,165 B2
(45) Date of Patent: Sep. 27, 2022

(54) STACKED PLV DRIVER ARCHITECTURE FOR A MICROELECTROMECHANICAL SYSTEM SPATIAL LIGHT MODULATOR

(71) Applicant: SILICON LIGHT MACHINES CORPORATION, Sunnyvale, CA (US)

(72) Inventors: Alexander Payne, Ben Lomond, CA (US); Lars Eng, Los Altos, CA (US); James Hunter, Campbell, CA (US)

(73) Assignee: SILICON LIGHT MACHINES CORPORATION, San Jose, CA (US)

( * ) Notice: Subject to any disclaimer, the term of this patent is extended or adjusted under 35 U.S.C. 154(b) by 162 days.

(21) Appl. No.: 16/780,543

(22) Filed: Feb. 3, 2020

(65) Prior Publication Data
US 2020/0247052 A1    Aug. 6, 2020

Related U.S. Application Data

(60) Provisional application No. 62/801,577, filed on Feb. 5, 2019.

(51) Int. Cl.
*G02B 26/08*      (2006.01)
*G02B 26/06*      (2006.01)
(Continued)

(52) U.S. Cl.
CPC .......... *B29C 64/268* (2017.08); *B29C 64/135* (2017.08); *B29C 64/153* (2017.08);
(Continued)

(58) Field of Classification Search
CPC ....... G02B 26/0833–26/0866; H04N 1/40056; H04N 9/312; H04N 9/3126; G09G 3/34;
(Continued)

(56) References Cited

U.S. PATENT DOCUMENTS 4,615,595 A * 10/1986 Hornbeck .......... G02B 26/0841
                                              359/291
4,662,746 A * 5/1987 Hornbeck .............. G02B 26/08
                                              359/223.1
(Continued)

OTHER PUBLICATIONS

International Search Report for International Application PCT/US20/16866 dated Jun. 3, 2020.
(Continued)

*Primary Examiner* — Zachary W Wilkes
(74) *Attorney, Agent, or Firm* — William Nuttle

(57) ABSTRACT

A spatial light modulator (SLM) including a two-dimensional (2D) array of n rows of m pixels, and a stacked drive circuit including at least one, one-dimensional (1D) array of n*m drivers monolithically integrated on the same substrate and methods of fabricating and methods of using the same in materials processing applications are provided. Generally,
(Continued)

each pixel includes at least one modulator, and is configured to modulate light incident thereon in response to drive signals received from the stacked drive circuit. The 1D array of the stacked drive circuit includes a single row of n*m drivers arranged adjacent to and laterally separated from the 2D array of pixels. Other embodiments are also described.

12 Claims, 13 Drawing Sheets

(51) Int. Cl.
*B29C 64/268* (2017.01)
*B33Y 10/00* (2015.01)
*B29C 64/135* (2017.01)
*B29C 64/153* (2017.01)
*B29C 64/277* (2017.01)
*B33Y 30/00* (2015.01)
*B29C 64/393* (2017.01)
*B33Y 50/02* (2015.01)

(52) U.S. Cl.
CPC ............ *B29C 64/277* (2017.08); *B33Y 10/00* (2014.12); *B33Y 30/00* (2014.12); *G02B 26/06* (2013.01); *G02B 26/085* (2013.01); *B29C 64/393* (2017.08); *B33Y 50/02* (2014.12)

(58) Field of Classification Search
CPC .... G09G 3/36; G09G 3/3674; G02F 1/13454; G02F 1/13452
USPC .......................................... 349/139; 359/318
See application file for complete search history.

(56) References Cited

U.S. PATENT DOCUMENTS

| | | | |
|---|---|---|---|
| 7,064,883 B2* | 6/2006 | Payne | G02B 26/001 359/290 |
| 7,479,642 B2* | 1/2009 | Maack | G02F 1/134336 250/394 |
| 8,405,913 B2* | 3/2013 | Maeda | B41J 2/465 359/668 |
| 8,730,557 B2* | 5/2014 | Bloom | G02B 26/00 359/290 |
| 9,395,531 B2* | 7/2016 | Yeung | G02B 26/0808 |
| 2004/0036950 A1* | 2/2004 | Hunter | G02B 26/0808 359/295 |
| 2005/0122560 A1 | 9/2005 | Sampsell et al. | |
| 2008/0018583 A1* | 1/2008 | Knapp | G02F 1/1333 345/87 |
| 2013/0050842 A1 | 2/2013 | Maeda | |
| 2013/0278912 A1 | 10/2013 | Owa et al. | |

OTHER PUBLICATIONS

Written Opinion of International Searching Authority Application PCT/US20/16866 dated Jun. 3, 2020.

* cited by examiner

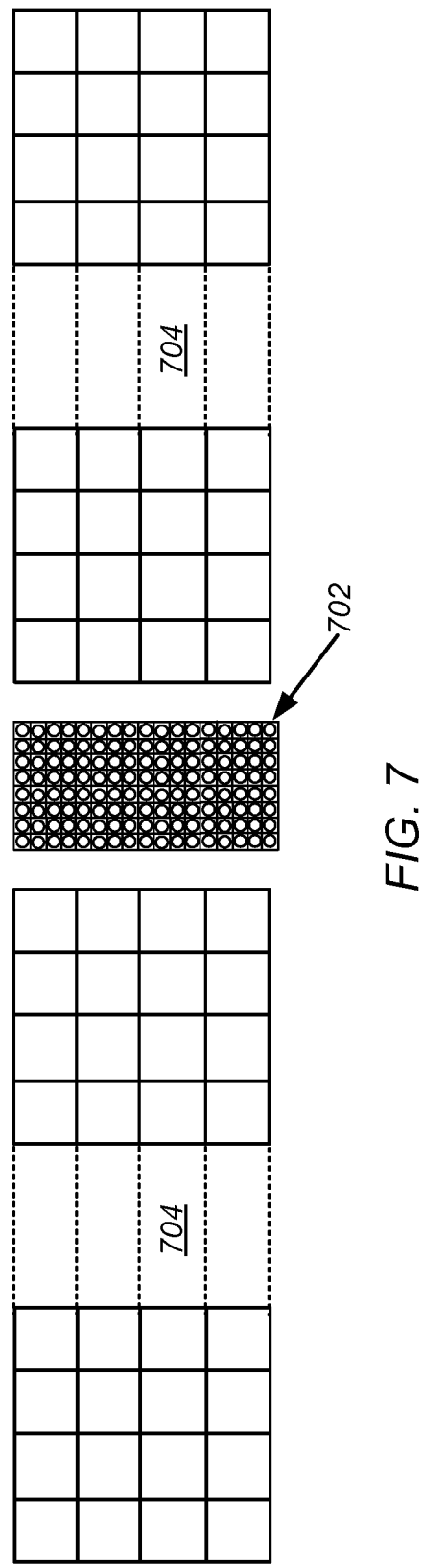

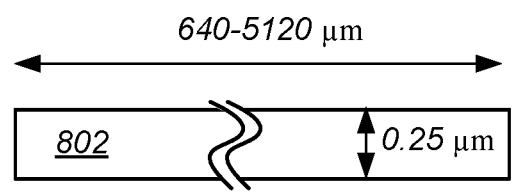
*Top view*
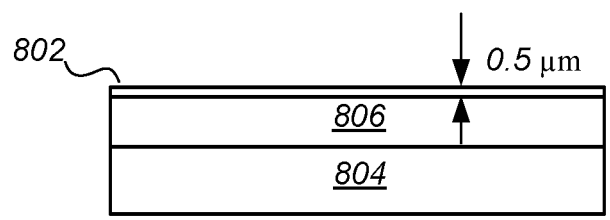
*Side view*
FIG. 8

STACKED PLV DRIVER ARCHITECTURE FOR A MICROELECTROMECHANICAL SYSTEM SPATIAL LIGHT MODULATOR

CROSS-REFERENCE TO RELATED APPLICATIONS

This application claims the benefit of priority under 35 U.S.C. 119(e) to U.S. Provisional Patent Application Ser. No. 62/801,577, filed Feb. 5, 2019, which is incorporated by reference herein in its entirety.

TECHNICAL FIELD

The present invention relates generally to microelectromechanical systems devices, and more particularly to spatial light modulators having associated device drivers monolithically integrated on the same chip and methods of making and using the same.

BACKGROUND

Microelectromechanical System (MEMS) devices are a category of devices formed by integrating mechanical elements, sensors, actuators, and electronics onto a common or shared substrate using semiconductor fabrication techniques. Spatial light modulators (SLM) are one type of MEMS device finding increasing use in various applications, including display systems, printing, maskless lithography, three dimensional (3D) printing, selective laser melting, sintering, and oxidation or ablation of a material on a workpiece.

Generally, a SLM includes a number of two-dimensional (2D) diffractors or modulators, each including a first light reflective surface on a top surface of a fixed structure suspended over a substrate, such as a face-plate or static ribbon, and a second light reflective surface over a top surface of electrostatically deflectable element suspended over the substrate adjacent to the first surface. In operation, a voltage applied between an electrode in the deflectable element and an electrode in the substrate provided by a drive circuit integrally formed in the substrate underlying (i.e. integrated) or adjacent to the first and second light reflective surfaces (i.e. non-integrated) causes the deflectable element to be deflected towards the substrate. In a diffractive SLM the first and second light reflective surfaces have equal area and reflectivity so that in operation deflection of the electrostatically deflectable element brings light reflected from the first light reflective surface into constructive or destructive interference with light reflected from the second light reflective surface.

A figure of merit used to characterize the performance of a SLM étendue. In optics, étendue refers the "extent" or how "spread out" the light is in area and angle. High étendue SLMs are desirable as accepting more illumination and providing higher output brightness and contrast. One problem with SLMs in general, and those including electrostatically deflectable elements in particular, is that the étendue of a diffractive SLM is limited by the pitch of spatial features of the modulator, i.e., the spacing of repeating reflective surfaces, relative to an illumination wavelength. To achieve high étendue it is desirable that a size of the modulators be reduced so that the spatial periods or pitch of the SLM can be reduced. However, as the size of the modulator decreases, a voltage required to move or drive the electrostatically deflectable elements increases sharply, requiring the use of larger, high voltage transistors in the drive circuit. An ideal SLM pixel has a size or pitch on the order of about 10 micrometers (μm), while drivers or drive circuits including high voltage transistors, and complimentary-oxide-semiconductor (CMOS) control circuitry often require a minimum driver size of from about 30-50 μm per pixel.

This disclosure describes MEMS structure for achieving high étendue while integrally forming the drive circuit on a common or shared substrate with a SLM including an array of 2D modulators.

SUMMARY

A spatial light modulator (SLM) including a two-dimensional (2D) array of pixels, and a stacked drive circuit including at least one, one-dimensional (1D) array of drivers monolithically integrated on the same substrate and methods of fabricating and utilizing the same are provided.

Generally, the 2D array of pixels are arranged over a surface of a substrate including at least n rows of m pixels, each pixel including at least one modulator configured to modulate light incident thereon, and the 1D array of drivers are arranged in a single row of n*m drivers adjacent to the 2D array of pixels, the single row of n*m drivers having a long axis parallel to the n rows of m pixels. Generally, each driver in the 1D array of drivers is electrically coupled to at least one pixel and is configure to provide a drive signal to modulate light reflected from the pixel.

In one embodiment, the stacked drive circuit includes a plurality of 1D arrays of drivers, each arranged in a single row adjacent and electrically coupled to laterally separated from n rows in the 2D array of pixels. Preferably, each of the plurality of 1D arrays of drivers include a width in a direction orthogonal to the long axis of the 1D array that is equal to n times a pitch p of the rows of pixels. More preferably, each driver in each of the 1D array of drivers is electrically coupled to at least one pixel through an interconnect arm, and each driver, other than a last driver in the 1D array most distal from the 2D array of pixels, is further electrically coupled to a load balance arm extending away from the driver towards the last driver in a direction parallel to the long axis of the 1D array to balance resistor-capacitance (RC) loading.

In another aspect, the invention is directed to a system for additive manufacturing comprising a SLM including a 2D array of pixels, and a stacked drive circuit to modulate a beam of light generated by a light source such as laser or light emitting diode (LED). Generally, the system further includes illumination optics to transfer light from the laser to the SLM; a vat into which material being added together is introduced; a transport mechanism to raise and lower a work surface on which an object is manufactured into the vat; imaging optics to transfer modulated light from the SLM toward the work surface; and a controller to control operation of the laser, SLM and transport mechanism. In one embodiment, the illumination optics are configured to illuminate substantially the entire array of the pixels with light from a single laser.

BRIEF DESCRIPTION OF THE DRAWINGS

Embodiments of the present invention will be understood more fully from the detailed description that follows and from the accompanying drawings and the appended claims provided below, where:

FIG. 7 is a schematic block diagram illustrating a 2D array of pixels and two columns of stacked driver/pixel units monolithically integrated on a shared substrate laterally adjacent thereto;

FIG. 8 illustrates side and top views of a portion of an interconnect line coupling a single pixel to an associated driver/pixel unit;

DETAILED DESCRIPTION

Embodiments of a Micro-Electromechanical System (MEMS) based spatial light modulator (SLM) for achieving high étendue while preserving or maintaining a lower drive voltage and smaller transistor footprint area for the drive circuit and methods of manufacturing the same are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding of the present invention. In other instances, well-known semiconductor design and fabrication techniques have not been described in particular detail to avoid unnecessarily obscuring the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

The terms "over," "under," "between," and "on" as used herein refer to a relative position of one layer with respect to other layers. As such, for example, one layer deposited or disposed over or under another layer may be directly in contact with the other layer or may have one or more intervening layers. Moreover, one layer deposited or disposed between layers may be directly in contact with the layers or may have one or more intervening layers. In contrast, a first layer "on" a second layer is in contact with that second layer. Additionally, the relative position of one layer with respect to other layers is provided assuming operations deposit, modify and remove films relative to a starting substrate without consideration of the absolute orientation of the substrate.

Figure 1A:
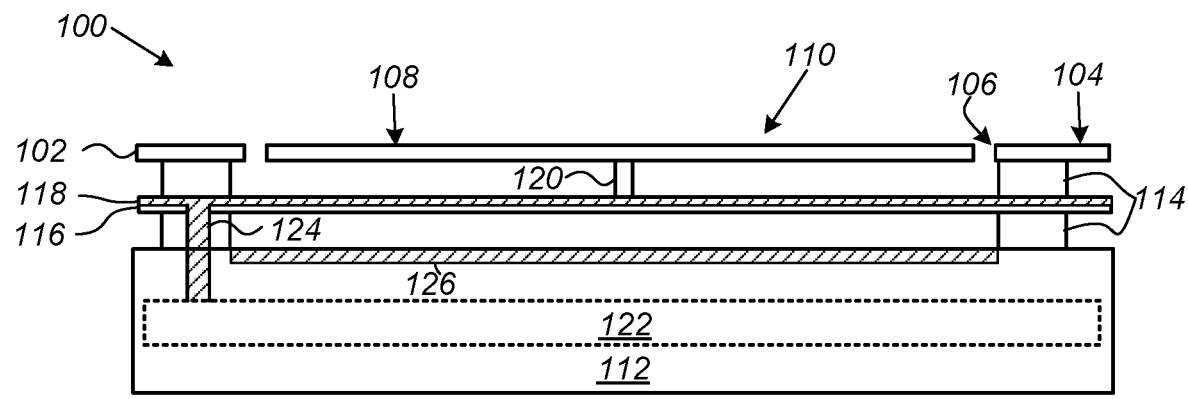
FIG. 1A is a schematic block diagram of a single diffractor or modulator of a spatial light modulator (SLM) configured for modulation of an amplitude of light incident thereon in a quiescent or undriven state.
Figure 1B:
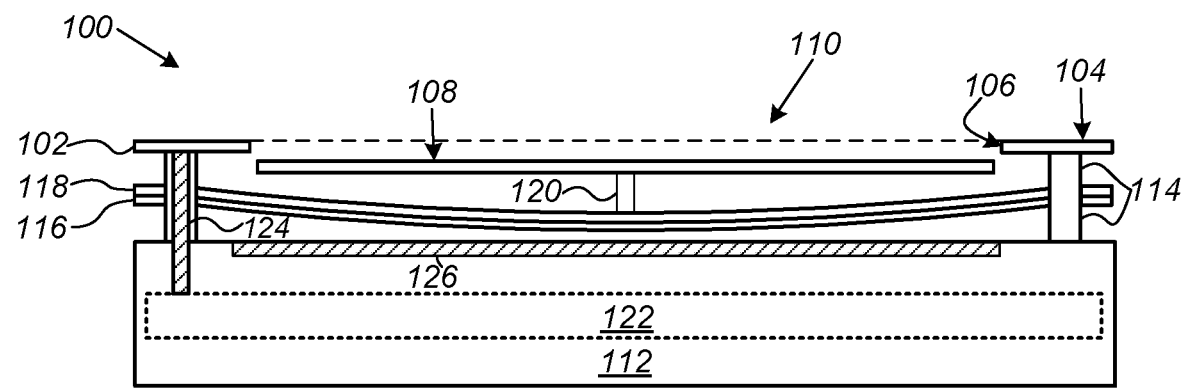
FIG. 1B is a schematic cross-section side view of the modulator of FIG. 1A in a deflected or driven state.
Figure 1C:
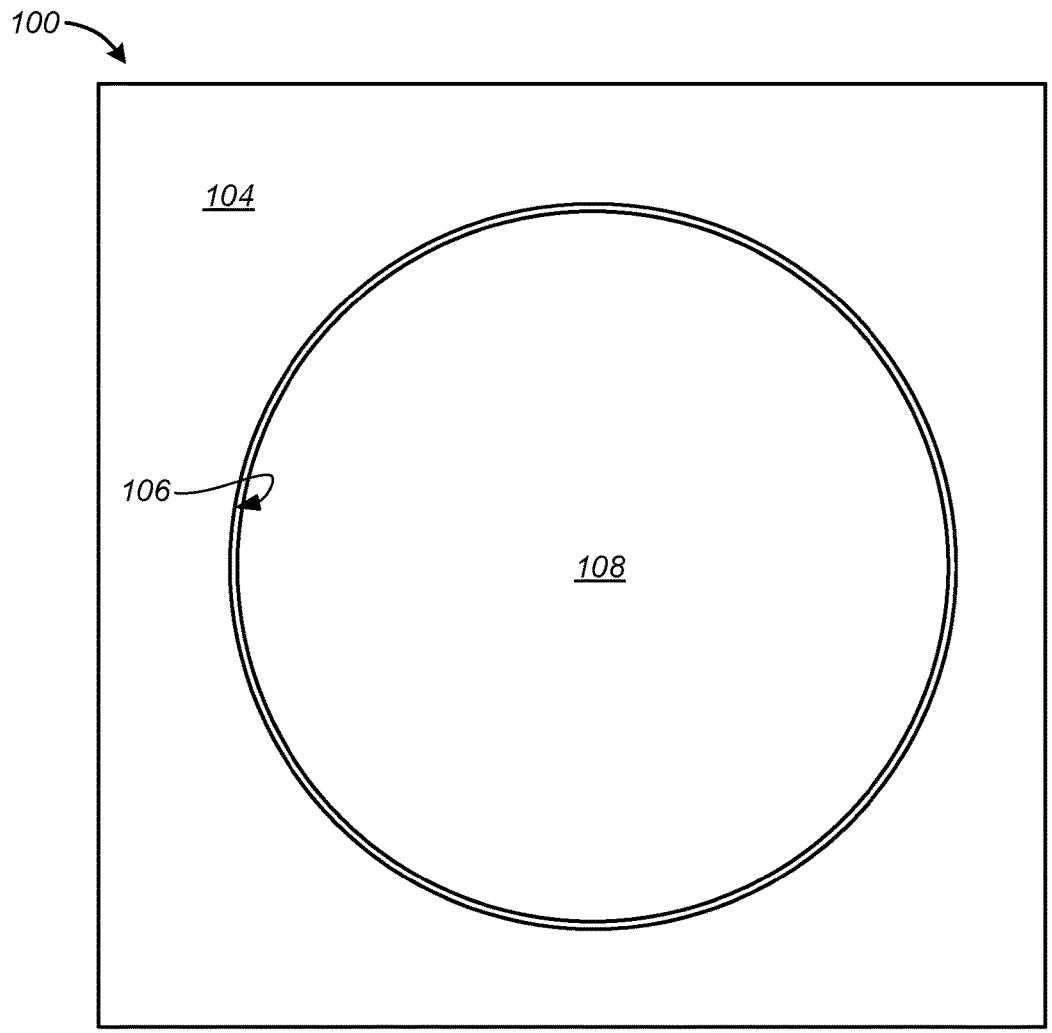
FIG. 1C is a schematic block diagram of a top view of the modulator of FIG. 1A.

The structure or architecture of the present disclosure is particularly suitable for use with embodiments of MEMs based diffractive SLM such as a Planar Light Valve (PLV™). The PLV™ is a diffractive SLM commercially available from Silicon Light Machines, Inc., of Sunnyvale, Calif. A single diffractor or modulator 100 of an embodiment of a PLV™ configured for amplitude modulation is shown in FIGS. 1A-1C, where FIG. 1A is a sectional side view of the modulator in a quiescent or undriven state, FIG. 1B is a sectional side view of the modulator in a deflected or driven state, and FIG. 1C is a top view of the modulator. Although only single modulator is shown in FIGS. 1A-1C it will be understood that a complete diffractive SLM such as the PLV™ generally includes a two-dimensional array of multiple modulators operated to modulate light incident thereon. A typical PLV™ can include from $10^3$ to about $10^7$ modulators 100, arranged in a columns and rows in the array.

Referring to FIGS. 1A and 1C, each individual modulator 100 includes a portion of a static tent member or face-plate 102 having a first reflector or light reflective surface 104 formed thereon, and an aperture 106 through which a second reflector or light reflective surface 108 of an electrostatically deflectable actuator or piston 110 is exposed. In some embodiments in which the modulator 100 is a diffractor, the size and position of the aperture 106 is chosen to satisfy an "equal reflectivity" constraint. That is the area of the second light reflective surface 108 exposed by the aperture 106 is substantially equal to the reflectivity of the area of the first light reflective surface 104 of the face-plate 102 of the individual modulator 100 outside the aperture 106.

The face-plate 102 is supported above a surface of a substrate 112 by one or more posts 114 by at corners of the modulator 100, and can be formed solely by layers forming the first light reflective surface 104. Alternatively the face-plate 102 can further include a uniform, planar sheet of a dielectric or semiconducting material, for example a taut silicon-nitride or silicon-germanium layer, over which the first light reflective surface 104 is formed.

In the embodiment shown, the piston 110 further includes in addition to the second light reflective surface 108 a mechanical layer 116 and an actuator electrode or electrode layer 118, which are separated from the second light reflective surface 108 by one or more central posts or supports. In the embodiment shown the actuator/electrode layer 118 is separated from the second light reflective surface 108 by a single central support 120. The mechanical layer 116 can include a taut layer of a material, such as silicon-nitride or silicon-germanium, supported by posts 114 at corners of the modulator 100. The electrode layer 118 can include a metal or other conductive material, such as a doped poly-crystalline silicon, formed on the mechanical layer 116, and is electrically coupled to an electrical ground or to drive circuit 122 integrally formed in or on the substrate 112 through electrically conductive vias 124 formed in or over one or more of the posts 114.

Referring to FIG. 1B, in operation, the piston 110 is deflected towards a lower electrode 126 formed in or on the substrate 112 by electrostatic forces generated when a voltage is applied between the lower electrode and the electrode layer 118 of the piston 110. Moving the piston 110 brings light reflected from the second light reflective surface 108 into constructive or destructive interference with light reflected by the first light reflective surface 104 of the static or stationary face-plate 102.

Referring to FIG. 1C, it is noted that the embodiments shown in FIGS. 1A through 1C are illustrative only, and although circular apertures 106 are shown in these embodiments, other aperture shapes including rings, ellipses, and polygons are possible. Additionally, the face-plate 102 of a single diffractor or modulator 100, or the modulator itself, may be square-shaped as shown in FIG. 1C, or it may be other shapes, such as triangles or rectangles. Only the equal reflectivity constraint (or the equal area principle if the surface reflectivities are the same) needs be satisfied for these to work well as high-contrast diffractive modulators.

Figure 2:
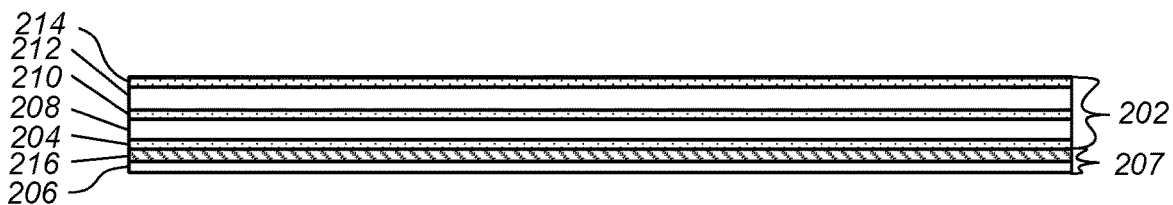
FIG. 2 is a schematic sectional side view of a stack of layers in a non-metallic, multilayer optical reflector including solid, low index material layers for use in the MEMS-based optical modulator according to an embodiment of the present disclosure.

Optionally, the reflectors or light reflective surfaces 104, 108, can include non-metallic optical reflector capable of modulating high power light. FIG. 2 is a schematic sectional side view of a stack of layers in a non-metallic, multilayer optical reflector according to one such embodiment. Referring to FIG. 2, in the embodiment shown the non-metallic, multilayer optical reflector 202 consists of five layers including a lower or first layer 204 of a high index material having a high index of refraction overlying electrostatically deflectable element 207 (i.e., a modulator of a PLV™), including a mechanical layer 206 and an electrode layer 216. A second layer 208 of a dielectric or low index material having a low index of refraction formed over the first layer 204, and a third layer 210 of a high index material having a high index of refraction formed over the second layer. A fourth layer 212 of a dielectric or low index material having a low index of refraction formed over the third layer 210, and a fifth layer 214 of a high index material having a high index of refraction formed over the fourth layer.

Where the electrostatically deflectable element is a modulator of a stepped PLV™ in which the second light reflective surface 108 is formed directly on the actuator 207, i.e., a modulator not including a central post 120 separating the second light reflective surface 108 from the electrode layer 118 and/or mechanical layer 116, the first layer 204 can be formed directly on the mechanical layer 206 or on an electrode layer 216 formed on the mechanical layer. In some embodiments, where the first layer 204 is formed directly on the electrode layer 216, the electrode layer can further serve or function as an absorber layer.

Optionally, by proper selection of the high index material and thickness of the first layer 204 both the mechanical layer and the first layer of the first light reflective surface 104 on the face-plate 102 and second light reflective surface 108 on the electrostatically deflectable element 207 or actuator can be formed from a single, taut or tensile silicon-nitride or silicon-germanium layer, which serves or functions as both the mechanical layer 206 and the first layer 204 of the multilayer optical reflector 202 for both the face-plate and the actuator.

In yet another embodiment, the mechanical layer 206, the electrode layer 216 and the first layer 204 of the multilayer optical reflector 202 can be formed from a single, taut or tensile layer, which serves or functions as the mechanical layer, the electrode layer and the first layer of the multilayer optical reflector 202 on the electrostatically deflectable element 207 or actuator, and the mechanical layer and the first layer of the multilayer optical reflector on the face-plate 102.

In one version of the above embodiments, the high index material of the first, third and fifth layers include silicon-germanium layers having an index of refraction (n) of about 4.0 at a target wavelength of 850 nm, and thicknesses of about 45 nm. The low index material of the second and fourth layers include silicon-dioxide layers having an index of refraction (n) of about 1.4 at the target wavelength, and a thicknesses of about 146 nm, to provide a reflectance of 99% or greater and an absorption of less than about 1%.

Figure 3:
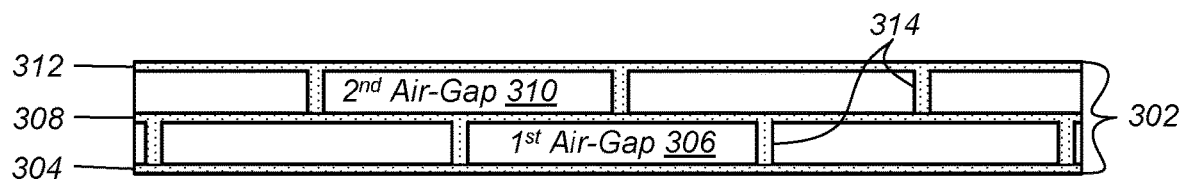
FIG. 3 is a schematic sectional side view of a stack of layers in a non-metallic, multilayer optical reflector including air gaps for use in the MEMS-based optical modulator according to another embodiment of the present disclosure.

In other embodiments, the low index material is or includes air, and the non-metallic, multilayer optical reflector includes layers of high index material interleaved or separated by air-gaps. FIG. 3 is a schematic sectional side view of a stack of layers in a non-metallic, multilayer optical reflector according to one such embodiment. Referring to FIG. 3, in the embodiment shown the non-metallic, multilayer optical reflector 302 consists of a lower or first layer 304 of a high index material having a high index of refraction overlying a mechanical layer of an electrostatically deflectable element or actuator (not shown in this figure). A second layer of air or a first air-gap 306 is formed over the first layer 304 by a third layer 308 of high index material formed over and suspended above the first layer. A fourth layer of air or a second air-gap 310 is formed over the over the third layer 308 by a fifth layer 312 of high index material formed over and suspended above the third layer. As with the embodiment of FIGS. 1A-C and FIG. 2 described above, the first layer 304 can be formed directly on the mechanical layer and/or an electrode layer of an electrostatically deflectable element or actuator 207, or can be physically separated therefrom by a center support 120, as shown and described with reference to FIGS. 1A-C.

The optical reflector can include from three to about twenty-one alternating layers of high index material and air-gaps, where the number of layers in the multilayer optical reflector is selected to be symmetrical about a mid-plane of the reflector, with equal numbers of layers above and below the mid-plane, and wherein the reflector is symmetrical about a neutral axis of the reflector to balance stresses and maintain optical planarity. Generally, as in the embodiment shown the reflector 302 further includes a number of periodic mechanical connections or posts 314 between layers of high index material in order to maintain the air-gaps 306, 310. The first and second air-gaps can be formed by deposition and subsequent removal of sacrificial layers between the layers of high index material, as explained in greater detail below. The posts 314 can be composed of the same material as the first, third and fifth layers and are typically formed concurrently with an overlying layer, by patterning the sacrificial layer prior to depositing the high index material.

In one version of this embodiment, the high index material of the first, third and fifth layers include silicon-germanium layers having an index of refraction (n) of about 4.0 at a target wavelength of 850 nm, and thicknesses of about 45 nm, and the air-gaps of the second and fourth layers have an index of refraction (n) of about 1.0 at the target wavelength, and a thicknesses of about 200 nm, to provide a reflectance of 99% or greater and an absorption of less than about 1%.

In addition to the high power handling capabilities of the multilayer optical reflector 202 of FIG. 2 which it shares, it is noted that because the air-gaps contribute substantially no mass to the optical reflector 302 of FIG. 3 or to the electrostatically deflectable element, a MEMS-based optical spatial light modulator including the air-gap reflector of FIG. 3 can be operated or switched between reflective and non-reflective states at a substantially higher speed than possible with a solid reflector or mirror. Moreover, in those embodiments in which all of the high index layers are made of a single, mono-material the reflector will have an intrinsic planarity, and is not subject to bimorph stress effects, which can arise when dissimilar materials are joined or laminated together to form a stack of layers.

Figure 4A:
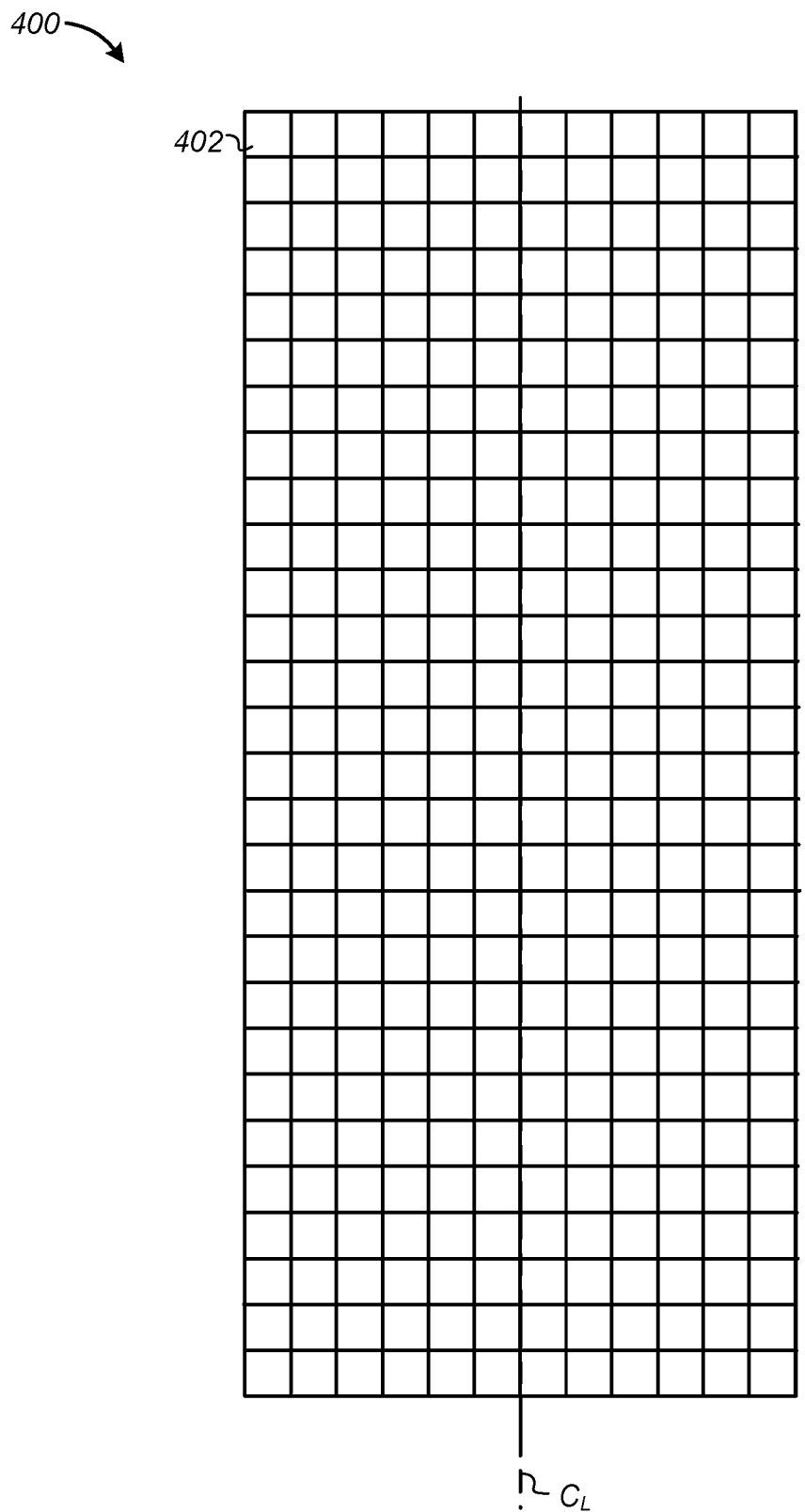
FIG. 4A is a schematic diagram of a top view of a two-dimensional (2D) array of pixels according to an embodiment of the present disclosure.
Figure 4B:
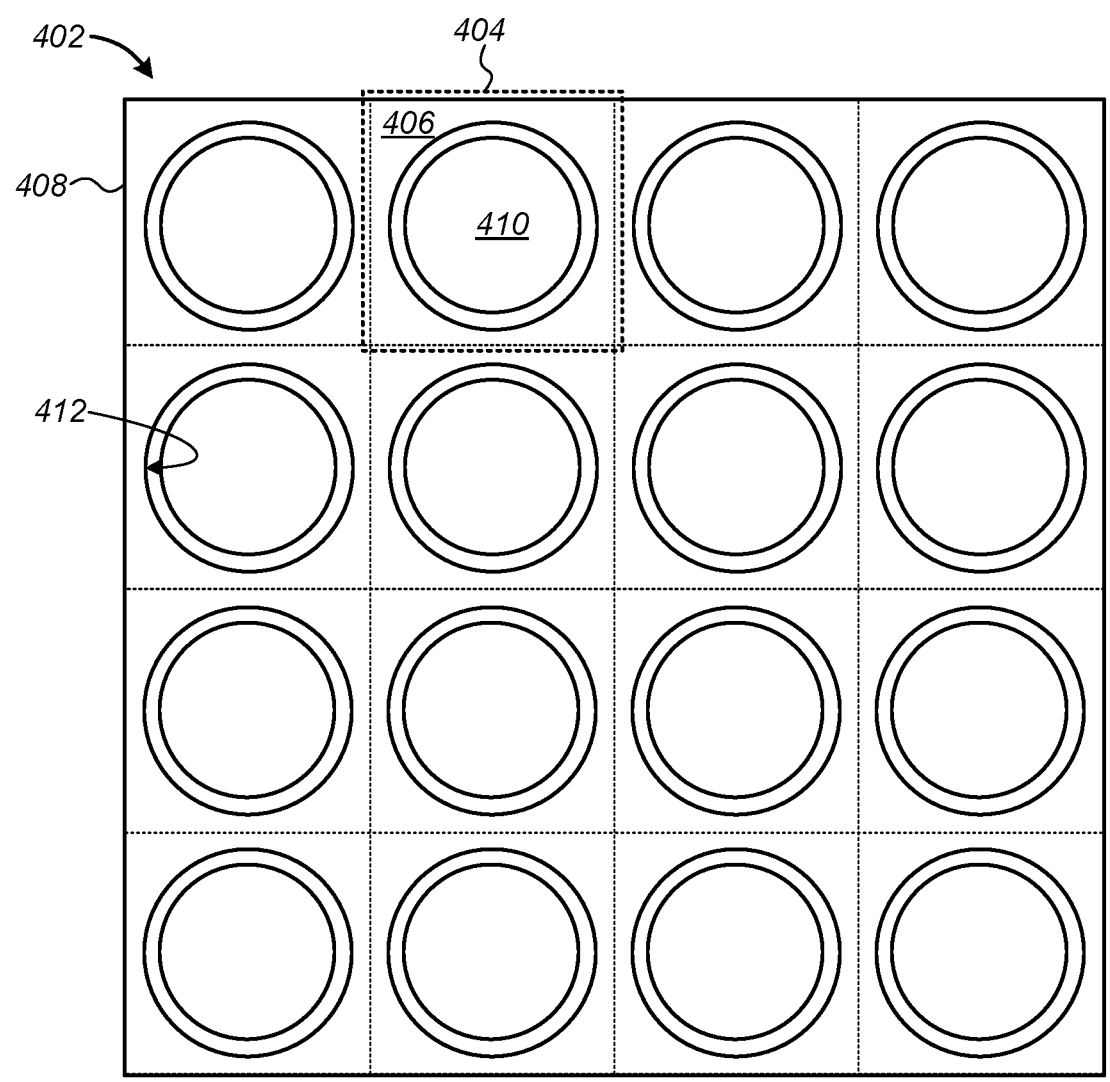
FIG. 4B is a schematic diagram of a top view of a single pixel in the array of FIG. 4A including multiple modulators according to an embodiment of the present disclosure.

An exemplary embodiment of an array of pixels, each including a number of modulators and suitable for use in a spatial light modulator will now be described with reference to the diagrams of FIGS. 4A and 4B. FIG. 4A is a schematic diagram of a top view of a portion of a two-dimensional (2D) array of pixels. FIG. 4B is a schematic diagram of a top view of a single pixel in the array of FIG. 4A including multiple modulators according to an embodiment of the present disclosure. Referring to FIG. 4A in the embodiment shown, the array 400 is a linear array including a number of pixels 402, each including one or more, individual diffractors or modulators 404 as shown in FIG. 4B.

Referring to FIG. 4B, in the embodiment shown each pixel 402 includes multiple, individual modulators 404, each including a first light reflective surface 406 formed by a portion of a static face-plate 408 of the diffractive SLM, and a second light reflective surface 410 mechanically coupled to an electrostatically deflectable element (not shown in this figure) and exposed through an aperture 412 in the face-plate 408. Generally, the size and position of the aperture 412 is chosen to satisfy the "equal reflectivity" constraint described above. That is a sum of the area of the second light reflective surfaces 410 in the each individual pixel 402 is substantially equal to the area of the first light reflective surfaces 406 on the face-plate 408 in the pixel. As with the embodiments described above in FIGS. 1A-1C, the face-plate 408 can be formed solely by a number of layers forming the first light reflective surface 406. Alternatively the face-plate 408 can further include a uniform, planar sheet of a dielectric or semiconducting material, for example a taut silicon-nitride or silicon-germanium layer, over or on which the first light reflective surface 406 is formed.

The array 400, or portion of such a linear array, depicted in FIG. 4A is shown as having 28 rows of 12 pixels 402 each grouped along a longitudinal axis ($C_L$) of the array, with each pixel including a square arrangement of 16 individual 2D modulators, such as those shown in FIGS. 1A through 1C. However, it will be appreciated that the array 400 can include any number of pixels 402 arranged in any number of rows of any length across the width or transverse axis of the array without departing from the spirit and scope of the invention. Similarly, the pixels 402 can include any number of individual diffractors or modulators 404 in any arrangement. In one embodiment, particularly suitable for use in a spatial light modulator of a system for materials processing, such as an additive three dimensional (3D) printing system or a Selective laser sintering (SLS) system, the array includes from 1 to 4096 rows of from 1 to 64 pixels each.

It is noted that a diffractive SLM including an array 400 with multiple pixels 402 each including sixteen (16) individual modulators 404, as in the embodiment shown in FIG. 4B, would have a spatial period or pitch one quarter (¼) that of a previous embodiments of diffractive SLMs including a single modulator per pixel. It is further noted however that this embodiment is for purposes of illustration only, and the each pixel 402 can alternatively include from one to any number of multiple individual modulators 404 limited only by a lithography process used to form the diffractive SLM.

Figure 5A:
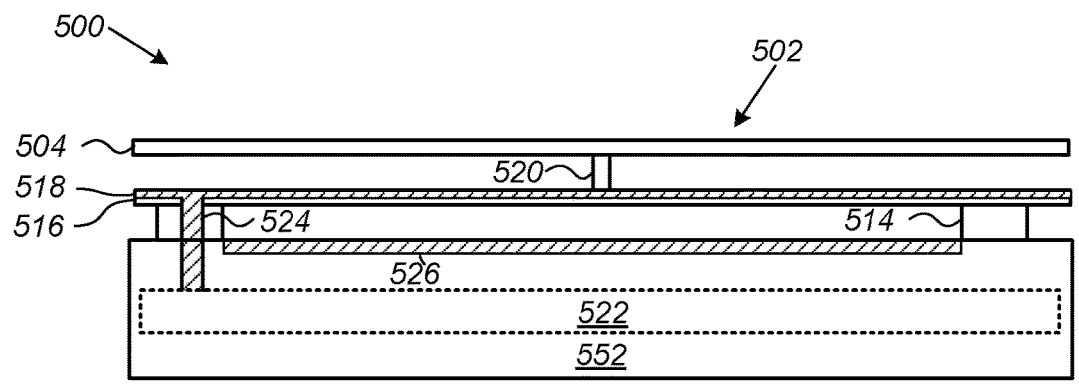
FIG. 5A is a schematic block diagram of a single 2D phase modulator configured for modulation of amplitude and phase of light incident thereon in a quiescent or undriven state.
Figure 5B:
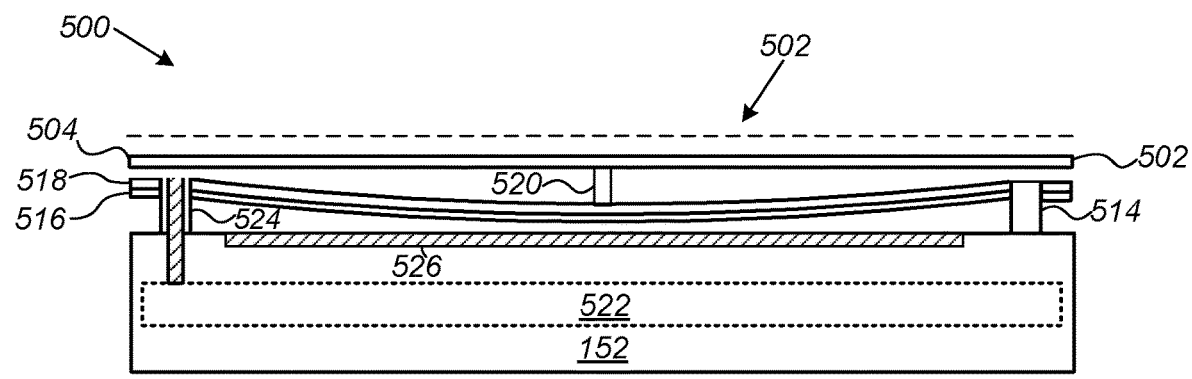
FIG. 5B is a schematic cross-section side view of the 2D phase modulator of FIG. 5A in a deflected or driven state.

In another embodiment, shown in FIGS. 5A-5D, the individual modulators are 2D phase modulators configured for modulating the phase of light incident thereon. FIG. 5A is a schematic block diagram of a single modulator of a PLV™ configured for phase modulation in a quiescent or undriven state. FIG. 5B is a schematic cross-section side view of the phase modulator of FIG. 5A in a deflected or driven state.

Referring to FIG. 5A, each individual phase modulator 500 includes an electrostatically deflectable actuator or piston 502 with a reflector or light reflective surface 504 formed thereon. The area and shape of the piston 502 and the light reflective surface 504 is substantially equal to the entire area of the phase modulator 500. The piston 502 further includes in addition to the light reflective surface 504 a mechanical layer 516 and an actuator electrode or electrode layer 518, which are separated from the light reflective surface 504 by one or more central posts or supports. In the embodiment shown the actuator/electrode layer 518 is separated from the light reflective surface 504 by a single central support 520. The mechanical layer 516 can include a taut layer of a material, such as silicon-nitride or silicon-germanium, supported by posts 514 at corners of the modulator 500. The electrode layer 518 can include a metal or other conductive material, such as a doped poly-crystalline silicon, formed on the mechanical layer 516, and is electrically coupled to an electrical ground or to drive circuit 522 integrally formed in or on the substrate 512 through electrically conductive vias 524 formed in or over one or more of the posts 514.

Referring to FIG. 5B, in operation, the piston 502 is deflected towards a lower electrode 526 formed in or on the substrate 512 by electrostatic forces generated when a voltage is applied between the lower electrode and the electrode layer 518 of the piston 502. Moving the piston 502 changes a phase of light reflected from the light reflective surface 504, as shown in FIG. 5C.

Figure 5C:
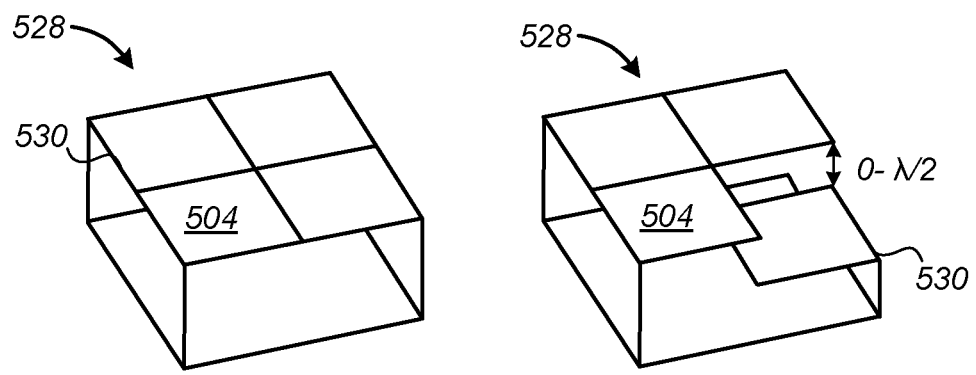
FIG. 5C are schematic diagrams illustrating positions of adjacent 2D phase modulators to modulate amplitude and/or phase of light incident thereon.

FIG. 5C is a schematic diagram of a top view of a portion of a single pixel 528 including multiple 2D phase modulators 500 according to an embodiment of the present disclosure. The left-hand figure in FIG. 5C illustrates a pixel of a phase modulator 528 in a quiescent or undriven state, and the right-hand figure illustrates the same pixel in an active or driven state. Referring to FIG. 5C, each pixel 528 includes multiple, individual phase modulators 530, each including a first light reflective surface 504 formed on the piston mechanically coupled to an electrostatically deflectable element (not shown in this figure).

Figure 5D:
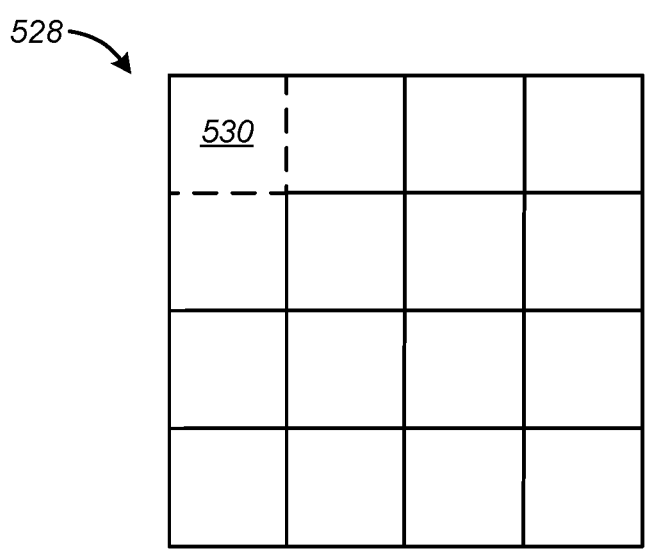
FIG. 5D is a schematic diagram of a top view of a single pixel including multiple 2D phase modulators according to an embodiment of the present disclosure.

FIG. 5D is a schematic diagram of a top view of a single pixel 528 in an array including multiple phase modulators according to an embodiment of the present disclosure. As with the embodiments described above in FIGS. 4A-4b, it is noted that a SLM configured for phase modulation can include an array with multiple pixels 528, each pixel including from one to any number of multiple individual phase modulators 530 limited only by a lithography process used to form the SLM. In the embodiment shown, the pixel 528 includes sixteen (16) individual modulators 530, and has a spatial period or pitch one quarter (¼) that of a previous embodiments of SLMs configured for phase modulation.

Figure 6A:
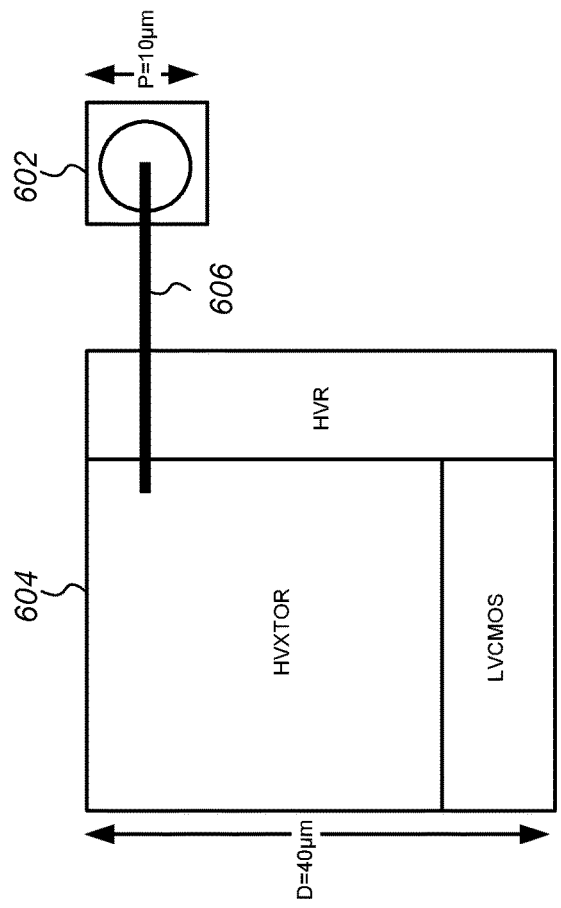
FIG. 6A is a schematic block diagram illustrating a single pixel and an associated driver/pixel units therefore monolithically integrated on a shared substrate laterally adjacent thereto.

A fundamental challenge for design of drive circuits or drivers for MEMs based diffractive SLM and PLVs in particular is the size mismatch between a single PLV™ pixel an associated driver. A schematic block diagram illustrating this size mismatch between a single PLV™ pixel and an associated driver therefor monolithically integrated on a shared substrate laterally adjacent thereto is shown in FIG. 6A. Referring to FIG. 6A, it is noted that a small PLV™ pixel size 602 is desired for large diffraction angle, large étendue and to pixels enable large pixel counts on practically sized chips or substrates. In certain embodiments, an ideal PLV™ pixel size is on the order of about 10 µm. The PLV™ pixel 602 is coupled to a driver 604 through an interconnect line 606. The driver 604 typically includes several sub-circuits a hat each require significant area, such as high voltage transistor (HVXTOR), high value resistor (HVR) and low-voltage complimentary-oxide-semiconductor (LVCMOS) control circuitry. This combination of sub-circuits often limits minimum driver size to 30-50 µm.

Moreover, as pixel gets smaller, even higher voltages are required, leading to a need for even larger HV transistors and high value resistors exacerbating the size mismatch.

In previous generations of SLMs including two dimensional (2D) array of PLV™ pixels with integrated drivers, the driver were placed directly underneath the larger PLV™ pixels. Typically these larger PLV™ pixels were on the order of 30 µm on a side, and because of the lower drive voltage required and by use of unique compact high-value resistors (HVR) is was possible for the drivers to fit under the 2D array of PLV™ pixels. However, as the dimensions of the PLV™ pixels continue to shrink, and the drive voltages increase leading to larger HVXTORs and HVRs this has proven problematic. Additionally, the fabrication processes for the HVRs and the integration of these processes with processes for fabricating the 2D-array of PLV™ pixels poses several difficulties. Firstly, one type of compact HVR incorporated a non-standard semiconductor material and had to be fabricated as part of MEMS fabrication processes (i.e. not standard CMOS processes used to fabricate the remaining HVXTOR and low voltage CMOS (LVCMOS) of the remainder of the driver). This leads to the need for multiple MEMS and CMOS fabrication processes, and requires a complex integration scheme to connect the HVR to the CMOS devices or layers. Secondly, it has proven difficult to reliably target non-standard HVR resistance with ion implant leading to large variation in resistances found within HVRs in fabricated by the same film/implant/anneal recipe. Finally, the non-standard HVR can exhibit large negative thermal coefficient of resistance, and/or a non-ohmic response.

Figure 6B:
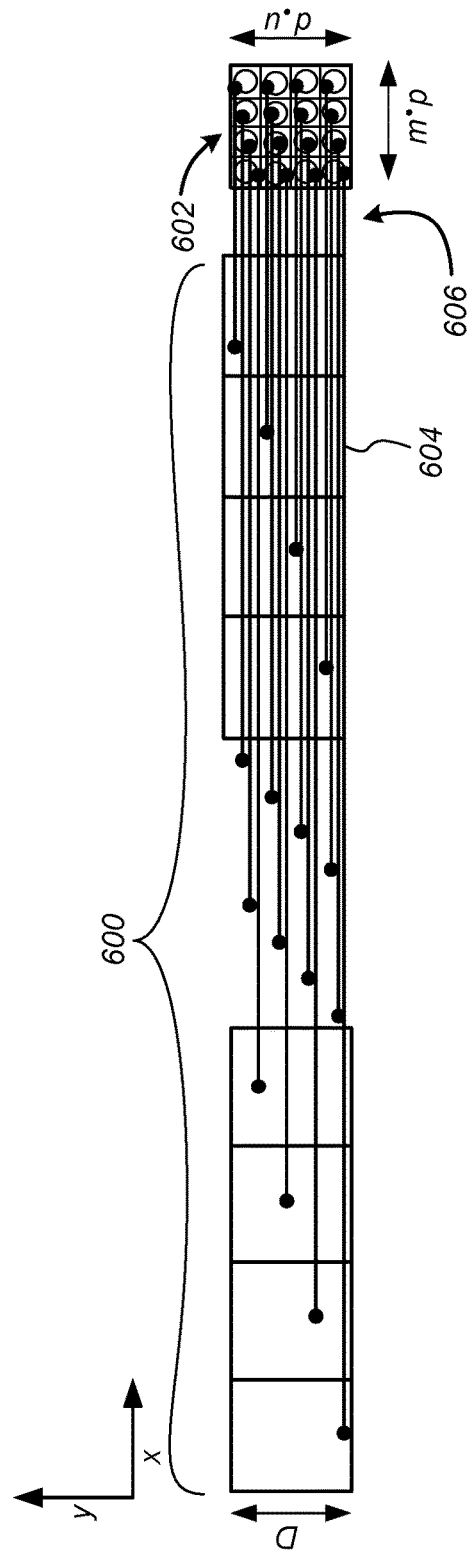
FIG. 6B is a schematic block diagram illustrating a two dimensional (2D) array of pixels and a one dimensional (1D) array of associated driver/pixel units therefor monolithically integrated on a shared substrate laterally adjacent thereto.

A solution to the above problems, illustrated in FIG. 6B, is a one dimensional (1D) array of associated drivers 600 monolithically integrated on a shared substrate laterally adjacent a 2D array of PLV™ pixels. Referring to FIG. 6B, to efficiently tile the external CMOS drivers 604, several PLV™ pixels 602 are stacked to match the driver pitch in a y-dimension, where P=Pixel pitch in the y-dimension and D=Driver pitch in the y-dimension. By arranging a number (n) of rows of PLV™ pixels 602 to match the pitch driver of a single driver 604 (n*P=D). In the embodiment shown in FIG. 6B n=4, and a 2D array n×m =16 PVL pixels 602 is driven by a 1D array or stack of n×m=16 drivers 604 at the left of the PLV™ pixels. Finally, an array of interconnect lines 606 connect each CMOS driver to an unique PLV™ pixel 602 in the 2D array.

In an embodiment shown in FIG. 7, the SLM 700 includes a continuous, linear 2D array of dense packed PLV™ pixels 702 and double-sided or two columns of stacked drivers 704 monolithically integrated on a shared substrate laterally adjacent thereto. PLV™ pixels 702 are coupled to the drivers 704 through interconnect lines 706. The result is a SLM a 2D array of dense packed PLV™ pixels 702 with integrated drive circuitry or drivers 704, having a high aspect ratio, suitable for direct write application (e.g. 8×4096), such as printing, three-dimensional (3D) printing, metal engraving, and selective laser melting.

TABLE I

| Driver Pitch | D | μm | 40 | 40 | 40 | 40 |
|---|---|---|---|---|---|---|
| Pixel Pitch | P | μm | 10 | 10 | 10 | 10 |
| Driver/Pixel Ratio | n | — | 1/4 | 1/4 | 1/4 | 1/4 |
| Pixel columns/Driver (single-side) | m | — | 4 | 8 | 16 | 32 |
| Driver Stack Depth | L | — | 16 | 32 | 64 | 128 |
| Driver Width (single-sided) | L | μm | 640 | 1280 | 2560 | 5120 |
| Driver Width (double-sided) | W | mm | 1.28 | 2.56 | 5.12 | 10.24 |
| Interconnect Pitch | S | μm | 2.5 | 1.25 | 0.625 | 0.3125 |
| Pixels/column | — | — | 4096 | 4096 | 4096 | 4096 |
| Array Length | — | mm | 40.96 | 40.96 | 40.96 | 40.96 |
| Total Pixels | — | — | 32768 | 65536 | 131072 | 262144 |

Table I is a table illustrating the large number of pixel counts enabled using a reasonably sized substrate and the arrangement of FIG. 7. Referring to Table I, this table shows large pixel counts, having large diffraction angles and large étendue to provide satisfactory contrast can be achieved in reasonably sized chip or substrate. For example, a pixel count of 262 k can be achieved with a chip or substrate of about 10 by about 41 mm.

In another aspect, the present disclosure is directed to a method and architecture for balancing Resistor-Capacitor (RC) loading of interconnect lines of a SLM including a 2D array of PLV™ pixels and one or more stacked drivers monolithically integrated on a shared substrate. FIG. 8 illustrates side and top views of a portion of an interconnect line 802 coupling a single PLV™ pixel to an associated driver/pixel unit (not shown in this figure). Referring to FIG. 8, the interconnect line 802 includes a conductive material, such as aluminum, deposited and patterned using standard CMOS fabrication techniques over a substrate 804 on which drivers and an array of a SLM are or will be formed. Generally, as in the embodiment shown the interconnect line 802 is deposited over a dielectric or oxide layer 806 formed on the substrate 804. For a SLM having a driver pitch D=40 um and pixel pitch P=10 um, and a single sided driver/PLV™ column depth m of from about 4 to about 32, the interconnect lines have a maximum length of from about 640 μm to about 5.12 mm. It is further noted that a typical aluminum (Al) interconnect line 802 fabricated using standard CMOS processing techniques has minimum critical dimensions (CD) of about 0.25 um width×5000 Å thick. The capacitance and resistance of an interconnect line 802 having these dimensions is typically very low, on the order of a capacitance C of about 5 to about 45 femto-Farads (fF), and a resistance (R) of about 128-1024Ω. Thus, RC loading of the interconnect line 802 is small, 1-50 picoseconds (ps), relative to a 4 μs column rate of the SLM.

Table II is a table illustrating interconnect line loading for different sizes of 2D array of PLV™ pixels.

TABLE II

| Driver Pitch | D | μm | 40 | 40 | 40 | 40 |
|---|---|---|---|---|---|---|
| Pixel Pitch | P | μm | 10 | 10 | 10 | 10 |
| Driver/Pixel Ratio | n | — | 1/4 | 1/4 | 1/4 | 1/4 |
| Pixel Columns | m | — | 4 | 8 | 16 | 32 |
| Driver Arm Length | L | μm | 640 | 1280 | 2560 | 5120 |
| Free-space Permittivity | e0 | F/m | 8.85E−12 | 8.85E−12 | 8.85E−12 | 8.85E−12 |
| Er (SiO2) | er | — | 3.9 | 3.9 | 3.9 | 3.9 |
| Al Width | w | μm | 0.25 | 0.25 | 0.25 | 0.25 |
| Dielectric Thickness | d | μm | 1 | 1 | 1 | 1 |
| Capacitance | C | fF | 5.5 | 11.0 | 22.1 | 44.2 |
| Al Thickness | w | μm | 0.5 | 0.5 | 0.5 | 0.5 |
| Al Resistivity | rho | ohm-m | 2.5E−8 | 2.5E−8 | 2.5E−8 | 2.5E−8 |
| Resistance | R | ohm | 128 | 256 | 512 | 1024 |
| Time Constant | RC | ps | 0.71 | 2.83 | 11.31 | 45.24 |
| Column Rate | T | μs | 4 | 4 | 4 | 4 |
| Time Constant/Column | RC/T | % | 0.0000% | 0.0001% | 0.0003% | 0.0011% |

Figure 9:
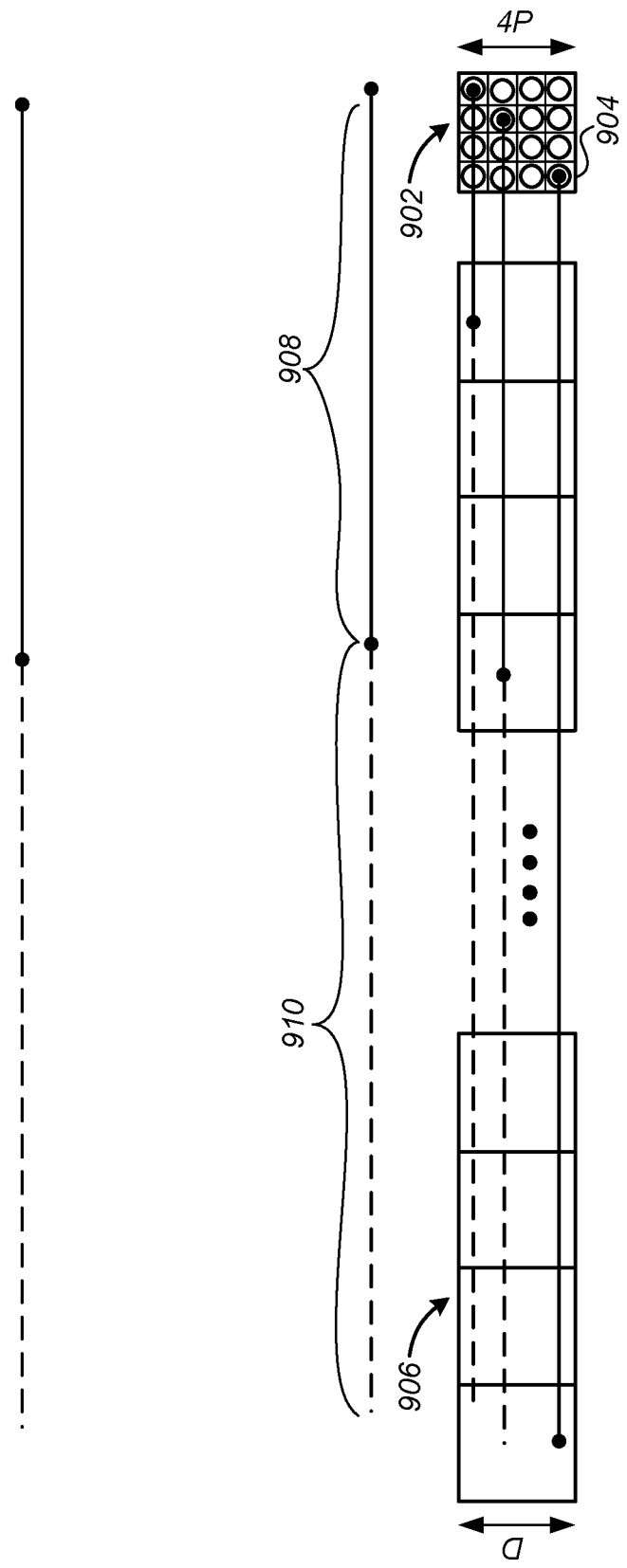
FIG. 9 is a schematic block diagram of a portion of 2D array of pixels and the associated driver/pixel units illustrating interconnect lines including an interconnect arm and load balance arm.

Although it has been shown from Table II above that the RC loading of the interconnect line is low, because of the 1D to 2D mapping, interconnect lines are naturally different in length, and at some point variations in the interconnect length could begin to affect pixel dynamic performance. One approach to eliminating any differences in RC loading across all pixels is to use "T" interconnect lines composed of two parts: (i) an interconnect arm connecting a single driver to a PLV™ pixel; and a load balance arm, i.e., a dummy stub added to each interconnect line to make total length and RC of all interconnect lines to all PLV™ pixels substantially identical. FIG. 9 is a schematic block diagram of a portion of 2D array 902 of PLV™ pixels 904 and the associated driver/pixel units 906 illustrating one such embodiment of "T" interconnect lines including an interconnect arm 908 and load balance arm 910.

In yet another aspect, the present disclosure is directed to a consideration of capacitive coupling between interconnect lines that could lead to cross-talk. Table III is a table illustrating cross capacitance between adjacent interconnect lines for different sizes of 2D array of PLV™ pixels.

TABLE III

| Driver Pitch | D | μm | 40 | 40 | 40 | 40 |
|---|---|---|---|---|---|---|
| Pixel Pitch | P | μm | 10 | 10 | 10 | 10 |
| Driver/Pixel Ratio | — | — | 1/4 | 1/4 | 1/4 | 1/4 |
| Pixel columns/Driver (single-side) | — | — | 4 | 8 | 16 | 32 |
| Driver Stack Count | — | — | 16 | 32 | 64 | 128 |
| Driver Arm Length | L | μm | 160 | 320 | 640 | 1280 |
| Driver Arm Pitch | s | μm | 2.5 | 1.25 | 0.625 | 0.3125 |
| Free-Space Permittivity | e0 | F/m | 8.85E−12 | 8.85E−12 | 8.85E−12 | 8.85E−12 |
| Al Width | W | μm | 0.25 | 0.25 | 0.25 | 0.25 |
| Al Thickness | W | μm | 0.5 | 0.5 | 0.5 | 0.5 |
| Equivalent Diameter | d | μm | 0.31 | 0.31 | 0.31 | 0.31 |
| Cross Capacitance | C | fF | 1.6 | 4.6 | 16.0 | 2224.2 |

Figure 10:
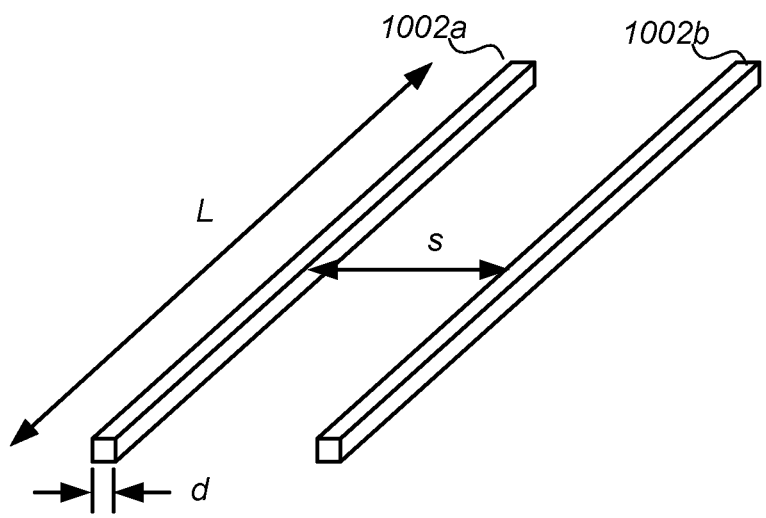
FIG. 10 is a schematic block diagram of a perspective view of the adjacent interconnect lines and an equation for calculating cross capacitance thereof.

FIG. 10 is a schematic block diagram of a perspective view of the adjacent interconnect lines 1002a, 1002b, and is will be referred to in connection with equation (Eq. 1) below for calculating cross capacitance thereof.

$$C = \frac{\varepsilon_0 \varepsilon_r \pi L}{\ln\left(\frac{s}{d} + \sqrt{\left(\frac{s}{d}\right)^2 - 1}\right)} \quad \text{(Eq. 1)}$$

Referring to FIG. 10 and the Eq. 1, calculation shows cross-coupling between interconnect lines with dimensions' such as those described above are negligible until the spacing between the lines approaches the width of the lines. Thus, by providing a 40 um driver pitch with a 16 stacking depth or length along the horizontal axis of about 640 μm and aluminum interconnect lines with a minimum CD of 0.25 um width×5000 Å thick, capacitive coupling is reduced to the order of a femto-Farad (fF), resulting in substantially no cross-talk between interconnect lines. Additionally, multi-layer interconnect lines and/or shielding may be used for high count or channel devices, i.e., of 2D arrays having a larger number of individual PLV™ pixels, to further reduce cross-talk.

A further advantage of a SLM including a 2D array of PLV™ pixels and one or more stacked drivers monolithically integrated on a shared substrate is that it allows use of a standard CMOS poly-Si resistor, as opposed to a more exotic high value resistor materials which as noted above can be difficult to control and problematic to integrate with existing MEMS and CMOS processes. High value resistors are needed to maintain low total power consumption. Standard high-resistance CMOS poly-silicon on the order of ~1.6 kΩ/square. Thus, using the standard line width and pitch, with one of the above layouts demonstrates that it is possible to fit two 2.5MΩ resistors inside a 40 um driver, while leaving ample room for HVXTORS and low voltage CMOS. FIG. 13 is a table illustrating resistance, dimensions and power consumption of a high value resistor fabricated using a CMOS Si-Polysilicon technology.

In still another aspect, the present disclosure is directed to a materials processing system including a SLM having a 2D array of pixels suitable for use in materials processing systems. Preferably, the SLM further includes a stacked drive circuit monolithically integrated on the same substrate with the 2D array as described above, however it will be understood that following system and method can also be implemented using a SLM without an integrated, stacked drive circuit. In particular, this aspect of the present disclosure is directed to an additive manufacturing system, such as three dimensional (3D) printing systems, Selective Laser Sintering (SLS) system or a Stereo Lithography Apparatus (SLA). Generally, 3D printing systems can use either a photopolymerization technology or Selective laser sintering (SLS) of a dry material such as a metal power. In photopolymerization is a liquid photopolymer or resin is exposed to a modulated beam of light that converts the liquid into a solid, building an object to be printed from a series of two-dimensional layers. Selective laser sintering involves melting and fusing together of fine, typically metal, particles using a high power light source such as laser or LED to build successive cross-sections of an object.

Figure 11A:
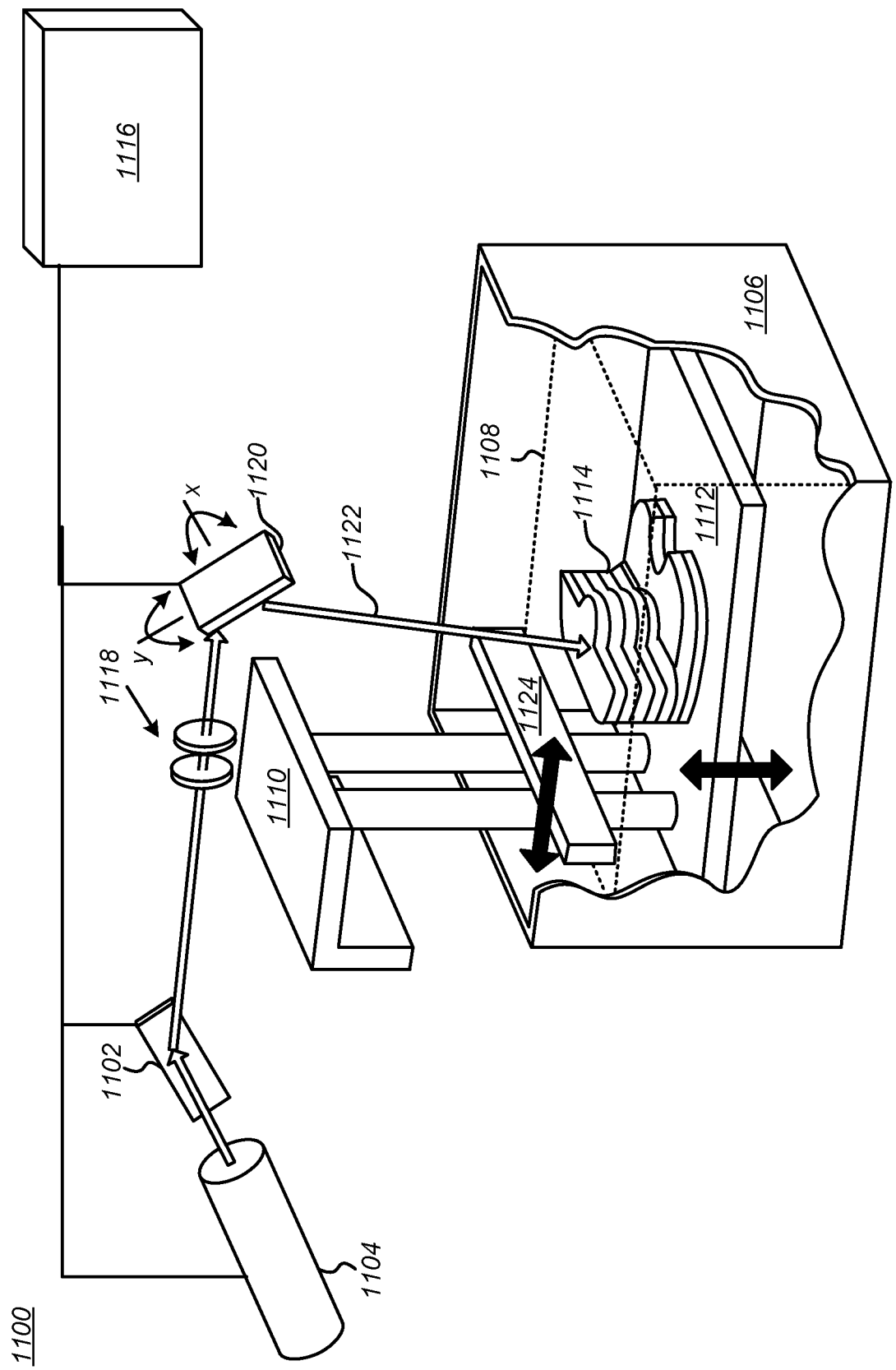
FIG. 11A is a schematic block diagram of an additive three-dimensional (3D) printing system including a diffractive SLM with a number of pixels, each with multiple modulators according to an embodiment of the present disclosure.

An embodiment of a polymerization three-dimensional (3D) printing system will now be described with reference to FIGS. 11A and 11B. Referring to FIG. 11A, the 3D printing system 1100 generally includes a MEMS-based diffractive SLM 1102 with a number of pixels, each with multiple modulators to modulate a beam of light generated by a laser 1104, a vat 1106 containing the photopolymer or resin 1108 (indicated by dashed lines), and a transport mechanism 1110 to raise and lower a work surface 1112 on which an object 1114 is printed into the vat as indicated by the vertical arrow. Referring again to FIG. 11A, the 3D printing system 1100 further includes imaging optics 1118 to transfer modulated light from the SLM toward the work surface 1112, a controller 1116 to control operation of the laser 1104, SLM 1102 and transport mechanism 1110. In some embodiments, the imaging optics 1118 can include magnification and filtering elements, such as a first Fourier Transform (FT) lens to focus and direct light from the SLM 1102 onto a scanning mirror 1120 that rotates to scan a modulated beam 1122 along a x-axis and a y-axis on a surface of the resin 1108 immediately above or adjacent to the work surface 1112.

The transport mechanism 1110 is adapted and controlled by the controller 1116 to lower the work surface 1112 into the vat 1106 as the modulated light converts the liquid resin 1108 into a solid, building successive layers or cross-sections of the object 1114 to be printed. Generally, the 3D printing system 1100 further includes a sweeper 1124 adapted to move as indicated by the horizontal arrow to spread or smooth fresh resin 1108 over surface sections of the object 1114 being printed.

Figure 11B:
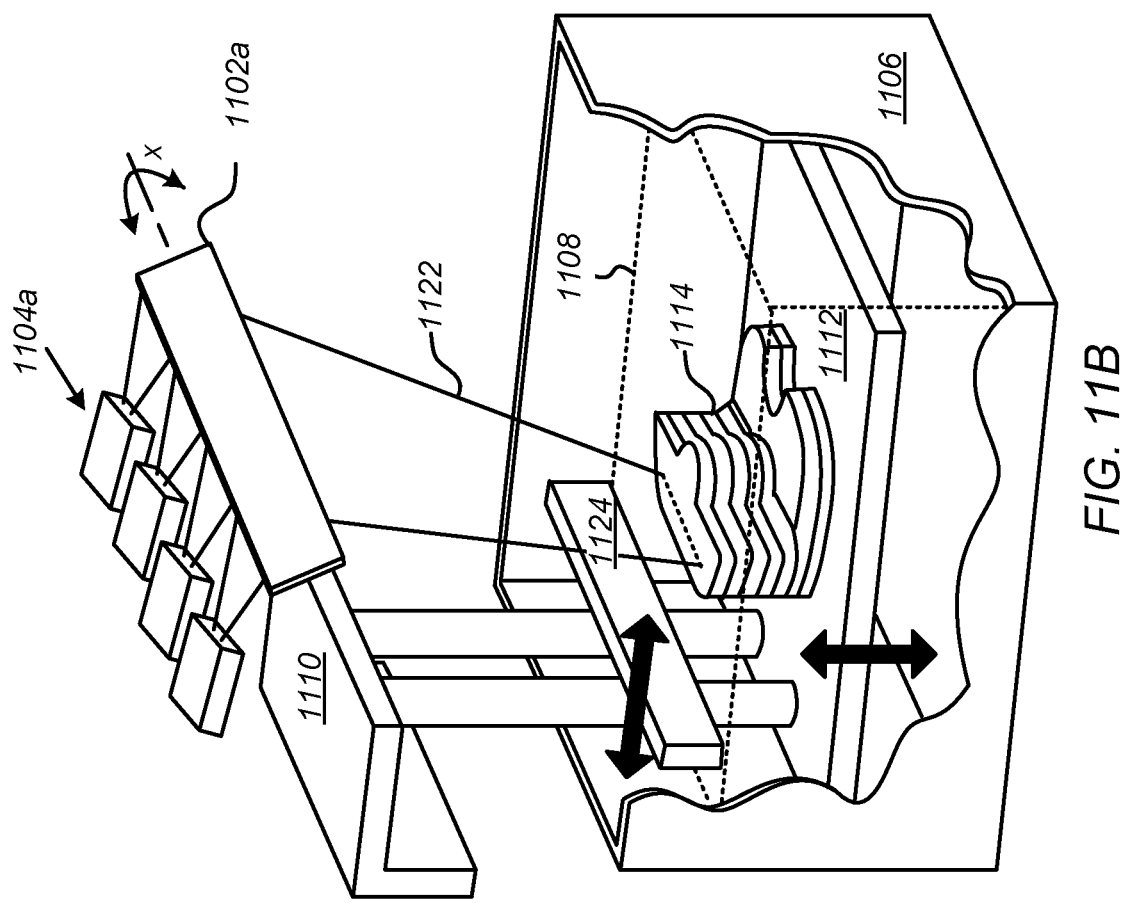
FIG. 11B is a schematic block diagram of an alternative embodiment of the 3D printing system including a light bar or multiple light sources to expose a substantially linear swath of a media in an imaging plane.

FIG. 11B is a schematic block diagram of an alternative embodiment of the 3D printing system 1100 of FIG. 11A including a laser light bar or multiple lasers 1104a to illuminate a large, linear SLM 1102a and expose a substantially linear swath 1122 on a surface of the resin 1108 immediately above or adjacent to the work surface 1112. As with the embodiment of FIG. 11A, a sweeper 1124 moves as indicated by the horizontal arrow to spread or smooth fresh resin 1108 over surface sections of the object 1114 being printed, and the 3D printing system 1100 further includes a controller 1116 to control operation of the laser 1104, SLM 1102a, transport mechanism 1110 and sweeper.

An advantage of the 3D printing system 1100 of FIG. 11B over that of FIG. 11A is the elimination of the need for a separate scan mirror 1120 (not shown in this figure) as the large, linear SLM 1102a illuminate a substantially linear swath over the work surface 1112 in a first or y direction, and the SLM can itself be rotated if desired to scan in a second or x direction as shown schematically in FIG. 11B.

Alternatively, as with the embodiment of FIG. 11A, the 3D printing system 1100 of FIG. 11B can further include a scanning mirror 1120 (not shown in this figure) located between the SLM 1102a and the work surface 1112 capable of rotating along either or both of an x-axis and a y-axis laterally to enable simultaneous or rapid sequential printing of multiple objects or objects larger than the area imaged onto the work surface.

Optionally, in either of the above embodiments the transport mechanism 1110 can be further adapted to move or reposition the work surface 1112 laterally to enable simultaneous printing of multiple objects or objects larger than the area imaged onto the work surface.

Finally, in another embodiment (not shown) the system can further include anamorphic illumination optics to transfer light from the light source to the SLM to illuminate substantially the entire array simultaneously, and anamorphic imaging optics to transfer light from the SLM to image a 2D image of the entire array on the work surface simultaneously. In some versions of this embodiment, the anamorphic imaging optics is adapted to resize and/or reshape the 2D image of the entire array on the work surface. Alternatively or additionally, the anamorphic imaging optics can be adapted to simultaneously image multiple instances of the 2D image of the entire array on the work surface.

Thus, embodiments of a SLM including a 2D array of pixels, and a stacked drive circuit monolithically integrated on the same substrate suitable, and methods of fabricating and operating the same in various processing systems have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Reference in the description to one embodiment or an embodiment means that a particular feature, structure, or characteristic described in connection with the embodiment is included in at least one embodiment of the circuit or method. The appearances of the phrase one embodiment in various places in the specification do not necessarily all refer to the same embodiment.

What is claimed is:

1. A spatial light modulator (SLM) comprising:
a two-dimensional (2D) array of pixels arranged over a surface of a substrate including at least n rows of m pixels, each pixel including at least one modulator configured to modulate light incident thereon; and
a stacked drive circuit comprising 1D array of drivers including n*m drivers arranged in a single row adjacent to the 2D array of pixels and having a long axis parallel to the n rows of the 2D array of pixels,
wherein each driver in the 1D array of drivers is electrically coupled to at least one pixel through an interconnect arm and configured to provide a drive signal to modulate light reflected from the pixel, and wherein each driver in the 1D array of drivers other than a last driver in the 1D array of drivers most distal from the 2D array of pixels is further electrically coupled to a load balance arm extending towards the last driver in a direction parallel to the long axis of the 1D array of drivers.

2. The SLM of claim 1, wherein each of the 1D array of drivers comprises a width in a direction orthogonal to the long axis that is equal to n times a pitch p of the rows of pixels.

3. The SLM of claim 1, wherein each modulator comprises a faceplate disposed above an upper surface of the substrate in spaced apart relation thereto and having a first planar light reflective surface formed on an upper surface facing away from the upper surface of the substrate, and a movable piston having a second planar light reflective surface parallel to the first planar light reflective surface so that light reflected from the first and second light reflective surface can be brought into constructive or destructive interference to modulate an amplitude of light reflected from the modulator.

4. The SLM of claim 1, wherein each modulator comprises a movable piston disposed above an upper surface of the substrate in spaced apart relation thereto and having a light reflective surface formed on an upper surface of the movable piston facing away from the upper surface of the substrate, and so that light reflected from the light reflective surface of a first modulator can modulate a phase of light reflected from the modulator.

5. The SLM of claim 4, wherein each modulator is configured to enable the piston to be displaced by a distance of lambda $(\lambda)/2$, where lambda is equal to a wavelength of light from a light source, and wherein a range of phase modulation of a reflected beam is $0\text{-}2\pi$.

6. A spatial light modulator (SLM) comprising:
a two-dimensional (2D) array of pixels formed on a surface of a substrate including at least n rows of m pixels, each pixel including at least one modulator configured to modulate light incident thereon; and
a stacked drive circuit integrally formed on the surface of the substrate adjacent to and co-planar with the 2D array of pixels, the stacked drive circuit including two columns of one-dimensional (1D) arrays of drivers, each column on one side of the 2D array of pixels, and each 1D array of drivers including a number of drivers arranged in a single row adjacent to one of the n rows in the 2D array of pixels and having a long axis parallel to the n rows of m pixels,
wherein each driver in each 1D array of drivers is electrically coupled to at least one pixel and is configure to provide a drive signal to modulate light reflected from the pixel.

7. The SLM of claim 6, wherein a sum of the number of 1D arrays of drivers in the two columns of 1D arrays of drivers adjacent to a single row in the 2D array of pixels is equal to m.

8. The SLM of claim 6, wherein each of the 1D arrays of drivers comprise a width in a direction orthogonal to the long axis that is equal to n times a pitch p of the rows of pixels.

9. The SLM of claim 6, wherein each driver in the 1D array of drivers is electrically coupled to at least one pixel through an interconnect arm, and wherein each driver other than a last driver in the 1D array most distal from the 2D array of pixels is further electrically coupled to a load balance arm extending towards the last driver in a direction parallel to the long axis of the 1D array.

10. The SLM of claim 6, wherein each modulator comprises a faceplate disposed above an upper surface of the substrate in spaced apart relation thereto and having a first planar light reflective surface formed on an upper surface facing away from the upper surface of the substrate, and a movable piston having a second planar light reflective surface parallel to the first planar light reflective surface so that light reflected from the first and second light reflective surface can be brought into constructive or destructive interference to modulate an amplitude of light reflected from the modulator.

11. The SLM of claim 6, wherein each modulator comprises a movable piston disposed above an upper surface of the substrate in spaced apart relation thereto and having a light reflective surface formed on an upper surface of the movable piston facing away from the upper surface of the substrate, and so that light reflected from the light reflective surface of a first modulator can modulate a phase of light reflected from the modulator.

12. The SLM of claim 11, wherein each modulator is configured to enable the piston to be displaced by a distance of lambda ($\lambda$)/2, where lambda is equal to a wavelength of light from a light source, and wherein a range of phase modulation of a reflected beam is 0-$2\pi$.

* * * * *